United States Patent

Higgins et al.

[15] 3,663,221
[45] May 16, 1972

[54] COLOR RECORDING ON PANCHROMATIC SENSITIZED MATERIAL BY ADDITIVE MODULATION OF PRE-EXPOSED GRATINGS

[72] Inventors: George C. Higgins; Clark N. Kurtz; Fred C. Eisen, all of Kodak Park Division, Rochester, N.Y. 14650

[22] Filed: Sept. 25, 1970

[21] Appl. No.: 75,459

[52] U.S. Cl. ..........................................96/22, 96/45, 96/116
[51] Int. Cl. ...................................G03c 7/00, G03b 33/00
[58] Field of Search...............................96/22, 117, 2, 45, 17

[56] References Cited

UNITED STATES PATENTS

| | | | |
|---|---|---|---|
| R20,748 | 6/1938 | Bocca | 355/32 X |
| 1,918,560 | 7/1933 | Rehlander | 96/117 X |
| 3,142,563 | 7/1964 | Alexander | 96/2 |
| 3,488,190 | 1/1970 | Smith | 96/17 |

Primary Examiner—Norman G. Torchin
Assistant Examiner—Alfonso T. Suro Pico
Attorney—W. H. J. Kline and Paul R. Holmes

[57] ABSTRACT

Three color components of a scene are recorded on a black-and-white film which has, for example, separate blue, green and red sensitive elements and which has been pre-exposed with blue light, with green light and with red light to a grating or grid pattern. The gratings may be recorded angularly disposed relative to one another, or if of different spatial frequencies, they may be mutually aligned for every pre-exposure. When the pre-exposed film is subsequently exposed in a camera to a visual scene, the additional component scene exposures representative of color components of the visual scenes modulate corresponding grating latent images in accordance with the color and luminance of the component scene elements. After proper processing of the film, a color image can be formed by placing the film in a spatial filtering projection system using color filters. The color image can then be recorded on conventional color print materials or displayed.

15 Claims, 7 Drawing Figures

United States Patent
Higgins et al.
[15] 3,663,221
[45] May 16, 1972
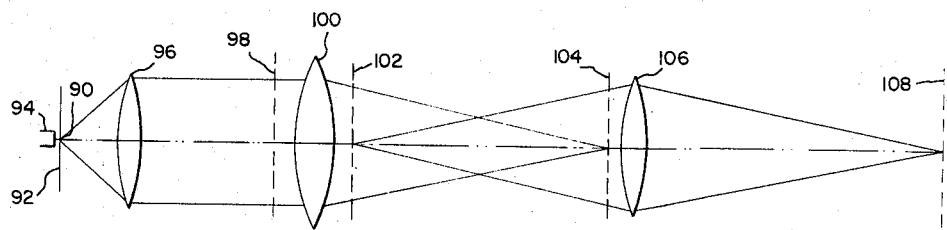

PATENTED MAY 16 1972

INVENTORS
GEORGE C. HIGGINS
CLARK N. KURTZ
FRED C. EISEN
BY

ATTORNEYS

INVENTORS
GEORGE C. HIGGINS
CLARK N. KURTZ
FRED C. EISEN

ATTORNEYS

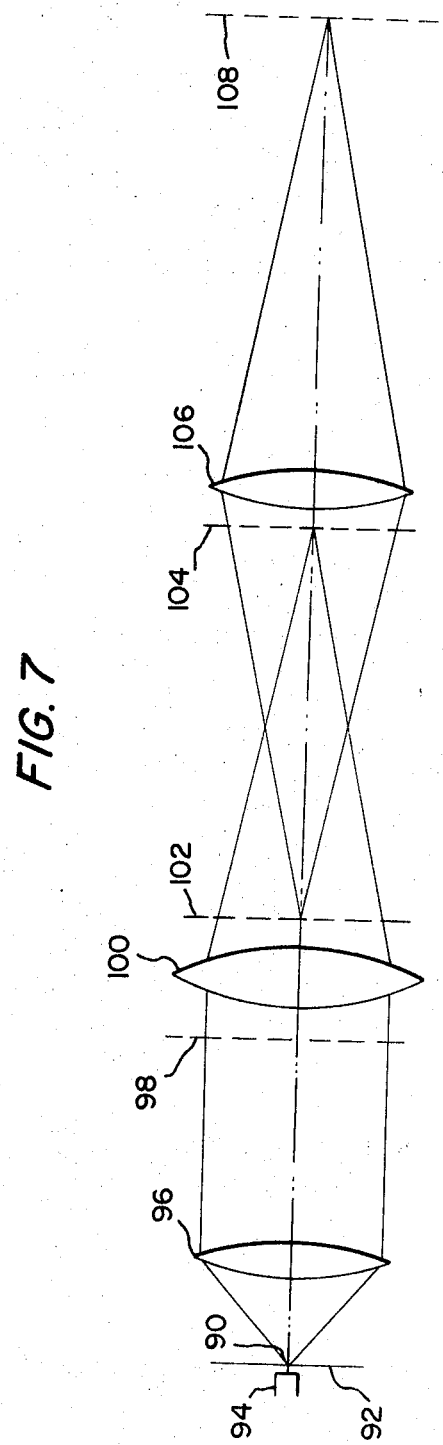

COLOR RECORDING ON PANCHROMATIC SENSITIZED MATERIAL BY ADDITIVE MODULATION OF PRE-EXPOSED GRATINGS

FIELD OF THE INVENTION

The present invention relates to color photography and more particularly to the recording of representations of color components of a visual scene on a monochrome storage media which has first been pre-exposed to gratings with light corresponding to the color components.

BACKGROUND OF THE INVENTION

The prior art discloses a method for recording three color images on single layer, monochrome panchromatic film by exposing the scene through three crossed grating patterns, one grating consisting of cyan colored (by transmittance) lines and uncolored transparent spaces, a second grating consisting of magenta colored lines and uncolored spaces and the third grating consisting of yellow colored lines and uncolored spaces. The three gratings are superposed in the plane of the panchromatic film emulsion for exposure to a visual scene. When the light from the visual scene falls on the gratings, the red component of the scene is modulated by the cyan grating, the green component is modulated by the magenta grating and the blue component is modulated by the yellow grating thereby encoding the color information as the scene is recorded on the panchromatic film. The luminance information is represented by the sum of the three color modulations.

After the color gratings have been removed and the film properly processed to form a transparency, the color and luminance information can be retrieved by projecting the processed film as a spatial filtering system using red, green and blue color filters.

A system incorporating the present invention has the following advantages, among others, over the prior art:

1. No color gratings are required when the color scene is being photographed;
2. Loss of effective film speed because of the absorption of the grating filters is eliminated; and
3. The exposure and the processing of the exposed photographic film are less critical than for the prior art systems.

DESCRIPTION OF THE INVENTION

Color reproductions can be obtained in accordance with this invention as follows:

1. Three photosensitive layer film, negative process, bleach: A three photosensitive layer film having a blue sensitive layer, a green sensitive layer and a red sensitive layer is exposed with blue light to a grating pattern angularly oriented in a first direction, with green light to a grating angularly oriented in the first or a second direction and with red light to a grating pattern angularly oriented in a first, the second, or a third direction. Mutually aligned gratings must have different frequencies from one another. The angular orientations of the gratings can be any angles which will adequately separate the spectra that are to be color filtered in the spatial filtering during projection. These exposures produce the latent image gratings angularly oriented in predetermined directions in the layers. The spacing of the grating lines can be any spacing that can be well resolved by the film emulsions being used and will produce first order spectra that are adequately separated from the zero order in the spatial filtering system. However, the spatial frequency of every grating must be at least twice the spatial frequency of its corresponding component scene to insure separation of the diffracted order from the zero order upon projection. The preferred range of frequencies for gratings lies within 10 to 500 lines per millimeter with the above restrictions based on scene frequency. It will be appreciated that grating frequencies outside this range may be used depending on film and lens resolution and other optical system limitations. It will be understood that every one of the gratings must have a fixed period, i.e., a repetitive interference cycle. This pre-exposed film is subsequently used as a camera film at which time the scene exposure modulates each latent image grating in accordance with the luminance and color of the scene elements. The film is then processed non-linearly and bleached. The total process is such that the relationship between exposure of the film and the amplitude transmittance during projection of light through the processed film is non-linear, i.e., the transmittance is not proportional to exposure.

A complementary color negative image of the scene can then be produced by projecting white light through the processed film in a spatial filtering system in which the first order spectra produced by the grating in the blue sensitive layer are passed through a blue filter, the first order spectra produced by the grating in the green sensitive layer are passed through a green filter and the first order spectra produced by the grating in the red sensitive layer are passed through a red filter. The second order, cross-product and zero order spectra are blocked. The first order spectra are combined to form a resultant complementary color negative image that can be recorded on a negative working color print material, such as Ektacolor paper or projected onto a television camera tube or viewing screen, to obtain a positive tone, real color reproduction of the scene photographed.

2. Mixed grain, single photosensitive layer film, negative process, bleach: The procedure is similar to that described in paragraph [1] above, but a mixed grain, single photosensitive layer film is used in which the emulsion layer is of the multigrain type that consists of a mixture of blue sensitive grains, green sensitive grains and red sensitive grains.

3. Three photosensitive layer film, reversal process, cross product spectra: The same type of three photosensitive layer film used in the procedure described in paragraph [1] is pre-exposed to grating patterns and subsequently to a color scene as in paragraph [1], but the film is then reversal processed to a silver density image so that the relationship between the exposure of the film and the amplitude transmittance of every layer of the processed film is linear, i.e., the transmittance is proportional to the exposure. A real color, positive tone image of the scene can then be produced by projecting the processed film in a spatial filtering system using white light in which the zero order and the first order spectra are blocked and the cross-product spectra produced by the gratings in the green sensitive layer and the red sensitive layer are passed through a blue filter, the cross-product spectra produced by the gratings in the blue sensitive layer and the red sensitive layer are passed through a green filter, and the cross-product spectra produced by the gratings in the blue sensitive layer and the green sensitive layer are passed through a red filter. The projected image can be recorded on a reversal type photosensitive color product such as Ektachrome film, or projected onto a television camera tube face or viewing screen.

4. Three photosensitive layer film, bleached grid, negative processed transparency, cross-product spectra: The same type of three photosensitive layer film used in paragraph [1] is pre-exposed to grating patterns as disclosed in paragraph [1]. The film is then negative developed, bleached, washed and dried in total darkness. Then the pre-treated film is exposed to a visual color scene. The film is then developed to a negative silver image, projected in a spatial filtering system using white light and the cross-product spectra passed through color filters as in paragraph [3], the zero order and first order spectra being blocked as in paragraph [3]. A negative, complementary color image of the scene is produced on the projection screen. The complementary color image can be printed on a negative working color print material. (Note: An emulsion is required which does not lose its spectral sensitization when the grating exposures are processed.)

Reference is now made to the drawings wherein like numbers denote like parts and wherein:

FIG. 7 is a schematic showing of a projection apparatus for reproducing a color representation of a visual scene utilizing the storage medium of the present invention.

The method of making the storage medium comprises providing a monochrome photosensitive storage media of the multilayer or multigrain type. The media is first pre-exposed to form therein latent image gratings which may be of several unique frequencies in which case they may be aligned or angularly disposed relative to one another.

Alternatively the gratings may be of the same frequency and angularly disposed relative to one another, the angular separations being sufficient to avoid overlap of first order images and prevent crosstalk. This pre-exposure is made such that the gratings are superposed in the media. After pre-exposure to form the latent image gratings, the media is exposed to a visual scene such that latent images of component scenes which represent color components of the visual scene are recorded on the media.

The media is then processed to produce a photostorage element which when light is passed therethrough produces first order spectra representative of the visual scene.

Figure 1:
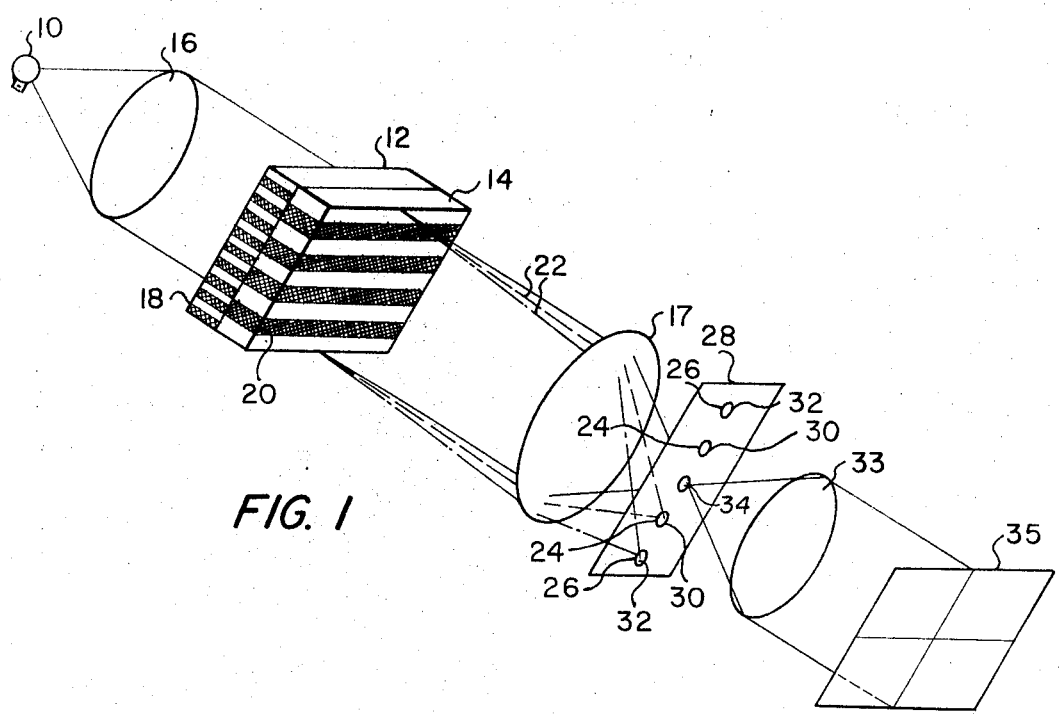
FIG. 1 is a schematic diagram showing how color scene information may be retrieved from the storage medium of the present invention.

As above stated, the storage media can be made up of a plurality of monochrome component color recording layers or a single multigrain monochrome layer or a combination of the two on a transparent support. It will be appreciated that the schematic showing of FIG. 1 is of two exemplary mutually aligned layers 12 and 14 with pre-exposed gratings or grids recorded thereon as 18 and 20. The layers 12 and 14 are very thin with the grating structure 18 existing in layer 12 and grating 20 in layer 14, or in the case of relief image, grating structures are present as irregularaties on the surface. Component scene images are recorded on the emulsion layers in addition to the gratings, but the component scene images are not shown for purposes of clarity. How and of what the storage medium may be prepared will be discussed by way of examples to follow:

For simplicity a two grating embodiment is shown in FIG. 1 although it will be appreciated that for full color image reconstruction a three grating embodiment is preferred. Referring to FIG. 1, a light source 10 such as an arc-lamp, illuminates emulsion layers 12 and 14, each containing a component scene image, through lens system 16. Further details of suitable image forming systems are fully explained in co-pending U.S. Pat. application Ser. No. 75,458 to Kurtz entitled "Standard and Color Television Reproduction from Superposed Monochrome Images Apparatus and Method" filed concurrently with the present application. Gratings 18 and 20 of different frequencies are within layers 12 and 14 respectively and are mutually aligned, i.e. superposed with parallel diffracting gratings. Beams 22 are diffracted by each grating and focused by lens 17 so that first order images of the light source 10, represented by 24 and 26, fall on light source image plane 28 at fixed areas 30 and 32, respectively. Grating frequencies are chosen so that the first order image produced by one grating does not overlap with any first or higher order image produced by the other grating and such that Moire effects and cross-talk are minimized. Naturally, any first order image overlap with a zero order image 34 is avoided by proper grating selection. Lens system 33 forms an image of storage mediums 12 and 14 in the transparency image plane 35.

Figure 2:
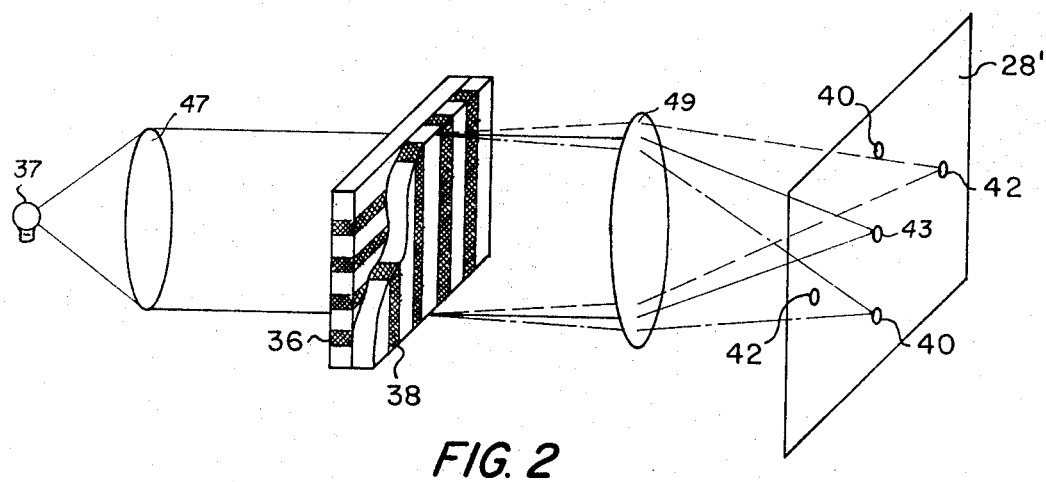
FIG. 2 is a schematic diagram showing the first order image positions formed upon projection of light through the storage medium of the present invention.
Figure 4:
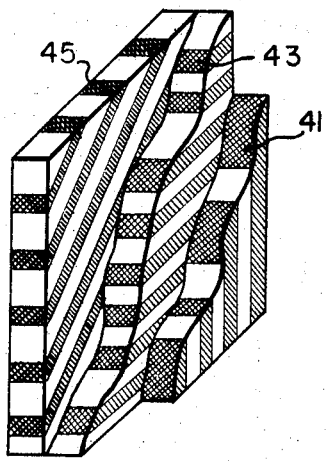
FIG. 4 is a greatly enlarged representation of a set of gratings in a storage medium having constant width stripes and spaces.

Alternative embodiments such as shown in FIGS. 2 and 4 may use gratings of the same or differing frequencies superposed but rotated at relative angles to one another. As shown in FIGS. 2 and 4, angular separations in the 30°–90° range are preferable for two or three grating systems since upon projection, image overlap problems are minimized. As can be seen in perspective in FIG. 2, source 37 illuminates gratings 36 and 38 which are disposed at 90° to one another, through lens system 47. The first order source images 40 and 42 focused by lens system 49 into plane 28' are 90° to one another. From this, it can readily be seen and appreciated that grating frequency selection may be made independently of concern for image overlap between corresponding images 40 and 42 produced by the gratings 36 and 38 at 90° to one another, so long as the frequencies are large enough to separate the first orders from the zero order 43. Observable Moire effects are also minimized if the gratings are angularly oriented. Zero order images are blocked and for reasons of simplicity other order images are not shown but they should not overlap the first order images.

FIG. 4 indicates in accordance with the preferred embodiment, a three layer storage media where Moire patterns are minimized by disposing grating 43 at 90° from grating 41 and grating 45 at 45° to grating 41. It is immaterial which layer contains which grating.

If a plurality of three gratings hereinafter to be described be used, a cross-product spectrum of two of the gratings may fall in the same relative angular position as the first or second order of the third grating. Separation is achieved by changing the grating frequencies or orientations. It should be noted that if relative grating angles are low, the filtering problem is difficult due to image overlap.

The mathematical description of two prior art methods and their relation to the additive exposure embodiments of the present invention follows:

Let $R_r$, $R_b$, and $R_g$ represent carrier grating exposures which in the conventional mode carry the red, blue and green scene information, respectively.

Let $S_r$, $S_b$, and $S_g$ represent the exposures due to the red, blue and green components of the recorded visual scene respectively.

A prior art system referred to as linear multiple image storage, as applied to color image recording utilizes a single rather than a multilayer photosensitive storage media, and the scene exposure must be made through colored gratings. When the red scene information, $S_r$, is exposed on the emulsion layer, the light from the scene is first passed through an appropriate filter grating $R_r$. The resultant exposure represents the product from $R_r S_r$. Other color component grating and scene simultaneous exposures are made in the same manner as $R_r S_r E$ is represented by $$E = R_r S_r + R_b S_b + R_g S_g \quad (1)$$

The emulsion is then processed to produce a complex amplitude transmittance in the resulting transparency which is linearly proportional to the exposure, $E$, by developing to a photographic gradient of $-2$. Such transmittance $T$ is represented by $$T \alpha R_r S_r + R_b S_b + R_g S_g \quad (2)$$

It is to be noted that the grating exposure is multiplied by the scene exposure for each color since they are simultaneously exposed onto a single layer.

A thermoplastic recording system such as described in U.S. Pat. No. 2,813,146 issued Nov. 12, 1957 to W. E. Glenn is also known. Again, multiplication of the color scenes and gratings is accomplished during exposure of the single layer material as in (1). Relief height h and therefore the optical path is then made proportional to exposure so that the resulting complex amplitude transmittance of the single layer is of the form:

$$T \alpha e^{ik\Delta nh} \quad (3)$$

where $$e^{ik\Delta nh} = e^{ik\Delta n(R_r S_r + R_b S_b + R_g S_g)}$$

where $k$ is some constant and $\Delta n$ is the difference between the refractive index of the thermoplastic recording medium and the external medium.

It should be noted that the grating and scene information for each color multiply in the exponent since they were simultaneously exposed. Exponent terms add because the exposures for each color are additive and the optical path in the thermoplastic recording medium is linearly related to exposure.

In accordance with one of the embodiments of the present invention, a photographic element comprising three separate superimposed color sensitized layers is used. As will be more explicitly set forth in the examples to follow, each layer is first pre-exposed to form a latent image grating, and then subsequently exposed to the particular scene, for example $R_r$ and $S_r$, respectively, for the red sensitive layer. Then each layer is linearly processed to obtain an amplitude transmittance $T$ of the form.

$$T_r \alpha (R_r + S_r) \qquad (4)$$

where red is the example layer. The amplitude transmittance of the blue and green sensitive layers are of the same form as (4).

It is apparent from (4) that the grating of a particular color layer is not modulated by a corresponding color signal as shown by the prior art representation (2) but is independent of it. Therefore, at least two or more layers are required to practice the invention since a carrier $R_r$ is not modulated by its corresponding signal $S_r$.

In accordance with the instant invention a plurality of layers, for example, three, are superposed such that the resulting amplitude transmittance $T$ is the product of the individual transmittances $T_r$, $T_b$ and $T_g$ as represented by $$T \alpha T_r T_b T_g \qquad (5)$$

where $$T_r T_b T_g \alpha (R_r + S_r)(R_b + S_b)(R_g + S_g)$$

and since $(R_r+S_r)(R_b+S_b)(R_g+S_g) + R_r R_b S_g + R_b R_g S_r + R_g R_r S_b +$ (other terms)

$$T \alpha R_r R_b S_g + R_b R_g S_r + R_g R_r S_b + \text{(other terms)}. \qquad (6)$$

In accordance with the invention, scene information for each color component scene image is multiplied by the product of the carriers of the other layers. Such information can be separated in an appropriate optical system as herein described and also optical systems such as that of said U.S. Pat. application Ser. No. 75,458 to Kurtz.

It is to be understood that no one layer alone can give the desired result because additional exposures are additive ($R+S$) rather than multiplicative ($RS$) as in (2). Furthermore, the carrier of, for example, the red information $R_r$ is not the red sensitized layer but is produced by the combined other layers, for example, the green and blue layers.

In a second embodiment of the invention, one of the plurality of layers is exposed first to a grating and then to a scene so that the total exposure is the sum of the two. For example, for red, $$E = R_r + S_r \qquad (7)$$

However, the exposure level and/or processing are such that the effect of the exposure is not linearly related to the exposure $R_r + S_r$, but is instead highly non-linear, causing the effect of the exposure to be substantially proportional to the product $R_r(1 \alpha \zeta S_r)$. Such exposure techniques are hereinafter described. The layer is processed and bleached so as to have an optical path, $d$, substantially proportional to the product $R_r(1 \alpha \zeta S_r)$ such that the layer, for example, the red sensitive layer, has a complex amplitude transmittance $T_r$ of the form $$T_r \alpha\ e^{ik\mu R_r(1+S_r)} \qquad (8)$$

where $\mu$ is a constant determined by the efficiency of the bleach process.

Relief variations and/or internal refractive index variations may contribute to the optical path of the bleached layer. The complex amplitude transmittance of each layer is similarly represented so that for a total of, for example, three layers the total complex amplitude transmittance $T$ is represented by $$T \alpha T_r T_b T_g$$

where $$T_r T_b T_g \alpha e^{ik\mu R_r(1-S_r)} e^{ik\mu R_b(1-S_b)} e^{ik\mu R_g(1-S_g)}$$

and since $$e^{ik\mu R_r(1-S_r)} e^{ik\mu R_b(1-S_b)} e^{ik\mu R_g(1-S_g)} = e^{ik\mu[R_r(1-S_r)+R_b(1-S_b)+R_g(1-S_g)]},$$

it follows that $$T \alpha e^{ik\mu[R_r(1-S_r)+R_b(1-S_b)+R_g(1-S_g)]} \qquad (9)$$

It should be appreciated that (9) describes a negative working system. Both positive and negative processing may be used to obtain the above results. Which one is used depends on the nature of the photographic materials used.

Mathematically, (8) is similar to prior art (3). However, the physical systems represented by (8) and (3) are produced differently and the storage elements as produced have a different structural configuration. In the system represented by (8) gratings and scenes are additively exposed and non-linear processing is used to obtain grating and scene multiplication. In the system represented by (3), exposure and processing are linear and multiplication is achieved by multiplication of scenes and carrier frequencies during exposure rather than by addition of exposure, to obtain a complex amplitude transmittance of the desired form.

Figure 3:
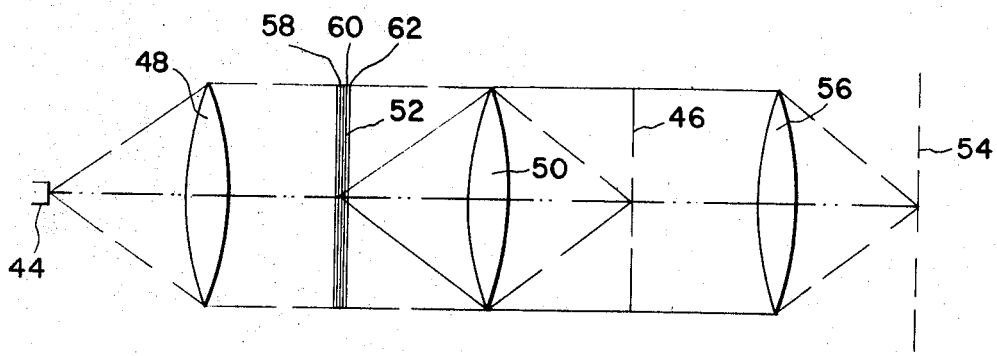
FIG. 3 is a schematic diagram of a preferred embodiment of the storage medium of the invention disposed in a projection apparatus.
Figure 5:
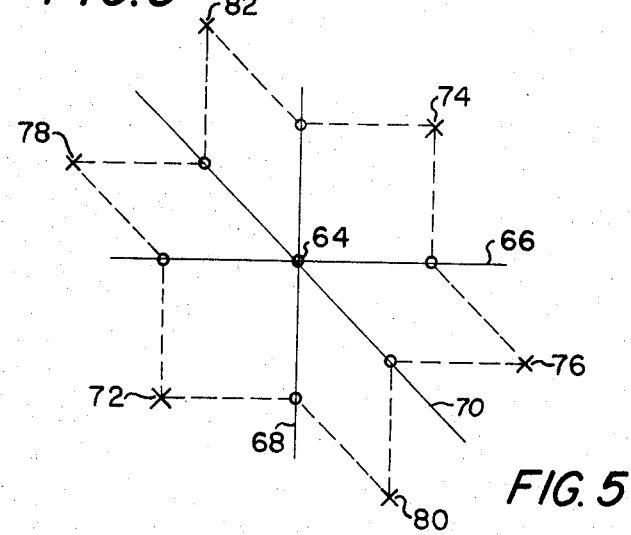
FIG. 5 is a representation of the images of source 44 produced at plane 46 in the configuration of FIG. 3.

It will be seen that in FIG. 3 of the drawings, source 44 is imaged in plane 46 by lens system 48 and 50. Transparency 52 is imaged in plane 54 by lens systems 50 and 56. Gratings 58, 60 and 62 may have the same frequency which may be represented substantially by the form cos wx and 60 and 62 are oriented at 45° and 90° respectively with respect to 58. FIG. 5 shows the pattern generated in plane 46 of FIG. 3 in accordance with the relationship shown by (5). FIG. 5 shows in accordance with relationship (6) an intersection 64 of the axes of $R_r$, $R_b$, and $R_g$, i.e. axes 66, 68 and 70, the latter two intersecting at 90° and 45° respectively to axis 66. Crosses 72 and 74 represent first order images $R_r R_b S_g$, crosses 76 and 78 represent $R_r R_g S_b$, and crosses 80 and 82 represent $R_g R_b S_r$. It is to be understood that for purposes of clarity only half the cross-points are shown. Color filters are placed according to which component scene image information is desired at the cross-points and the remaining orders of images are blocked. From the selected first order images, a color image is produced at plane 54 of FIG. 3.

In describing a second embodiment whose relationship is shown in (8), the fundamental component of the gratings is assumed to be cos wx. If the optical path variations are not too large, we can approximate $T$ by $T \alpha 1 + ik\mu(1-S_r) \cos(wx_r) + ik\mu(1-S_g) \cos(wx_g) + ik\mu(1-S_b) \cos(wx_b) +$ (other terms)

where $x_r$, $x_g$, and $x_b$ represents distance along the red, green and blue axis, and where we have replaced the gratings $R_r$, $R_g$, and $R_b$ by their fundamental cosine terms $\cos(wx_r)$, $\cos(wx_g)$, and $\cos(wx_b)$.

Figure 6:
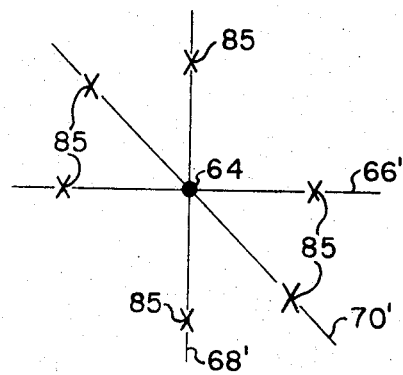
FIG. 6 is another representation of images of source 44 at plane 46 of FIG. 3.

In the above mathematical expression the three color signals, i.e., the red, blue, and green components of the scene are multiplied by their respective cosine gratings so that the pattern in plane 46 of FIG. 3 is that shown in FIG. 6. Point 64 is the intersection at which the zero order images are blocked. To obtain a color image, the first order images 85, denoted by the crosses, in plane 46 are passed through color filters (not shown). The signal on the red axis is denoted by the crosses 85 on 66', the blue by those on 68' and the green by those on 70'.

It is to be understood that higher order terms are present at plane 46 but transmission is blocked at the plane by an aperture plate. It will be appreciated that the choice of which axis carries a given color component is arbitrary.

Illustrative examples follow for the further understanding of the invention:

Color pictures were obtained by the additive modulation technique using the following photographic equipment.

A 35mm Nikon camera with a Micro-Nikkor Auto f/3.5, 55mm focal length lens was used to photograph test objects at 5× reduction. Test objects were mounted on a Kodak Deluxe Transparency Illuminator, Model 2, using a 100 watt frosted bulb controlled by a Variac and a 0.125 inch thick piece of Plexiglas W 2447, Type C70 as a diffuser. In the following first three examples, exposures were made onto Recordak Micro-File AHU Film, Type 5459. This film is a single photosensitive layer panchromatic film having a fine grain and an extremely high resolution. The grating latent images were obtained by photographing a glass plate containing a 10 line per millimeter (equal line and space widths) grating pattern. At the 5× reduction this gave 50 lines per millimeter on the film. Picture test objects were then placed on the same illuminator and photographed at the same reduction.

The spatial filtering projection apparatus used to produce the color pictures from the processed films is schematically shown by FIG. 7 which operates as follows:

One quarter inch diameter aperture 90, located in mask 92 passes light from source 94 which is a 25 watt Sylvania Concentrated arc lamp through lens 96 having a 2 inch focal length and a 1 inch aperture. The light then passes through plane 98 containing the gridded scene and from there through lens 100 having a 12 inch focal length and 1 inch aperture. If greater scene magnification is desired, the gridded scene may be placed in plane 102. Passing through spatial filtering elements in plane 104, the light goes through lens 106, a 12 inch, f/4.5 Kodak Anastigmat Lens onto the projected plane 108 containing a projection screen.

EXAMPLE 1 — PHASE IMAGE, SIMULATED THREE LAYER FILM

The above mentioned 10 line per millimeter grating was photographed on three frames of Recordak Micro-File AHU Film. Frame No. 1 had the grating lines oriented at about +45° from the horizontal, frame No. 2 had the grating lines oriented at about −15° from the horizontal, and frame No. 3 had the grating lines oriented about +105° from the horizontal. The exposure used to photograph the grating was 10 seconds at f/5.6 through a Wratten 99 filter with the 100 watt bulb in the illuminator operated through a Variac set at 65. It will be appreciated that the Wratten 99 filter is not necessary for color separation in these exposures and in those of the following examples, but it was used in order to get sharper grating images on the film.

After the grating exposure was made on each frame, a picture exposure was added. On frame No. 1, a monochrome negative representing the green component of a scene was photographed. On frame No. 2, a monochrome negative representing the red component of the same scene was photographed and on frame No. 3, a monochrome negative representing the blue component of the same scene was photographed. The exposure used for the picture was 10 seconds at f/5.6 through the Wratten 99 filter with the Variac set at 82.5.

The three exposed frames were then processed as follows:
1. 3 min. Kodak D-19, 70° F. (dip agitation)
2. 10 seconds rinse
3. 1 minute Kodak Rapid Fixer with Hardener
4. 2 minutes wash
5. 1 minute Kodak R-9 bleach
6. ½ minute wash
7. 1 minute Kodak CB-6 clear
8. 2 minutes wash
9. dry The processed film showed faint brownish images upon visual examination. When any of the three frames was projected in the apparatus shown in FIG. 7 with no spatial filtering, practically no image was formed in the picture plane 108. However, when the zero order was blocked out at the spatial filtering plane 104, a positive picture was formed in the picture plane 108 because of the optical path differences introduced by the phase modulating bleached transparency.

The three frames were superimposed in register and placed in plane 102 of FIG. 7. In the spatial filtering plane 104 apertures and color filters were placed so that only the first order spectra were passed and colored as follows:

The first order spectra produced by the grating to which the picture representing the green component had been added was passed through a green filter (Wratten 57); the spectra produced by the grating to which the picture representing the red component had been added was passed through a red filter (Wratten 24); and the spectra produced by the grating to which the picture representing the blue component had been added was passed through a blue filter (Wratten 38A). The spectra were combined to form an image in plane 108 which was a positive tone image in the correct colors enlarged about 3×.

The projected image was then recorded on Ektachrome R paper with an exposure time of 15 seconds. Upon standard processing, a full color picture was produced. It will be appreciated that a three photosensitive layer film behaves the same as three sections of superimposed single photosensitive layer film for projection.

EXAMPLE 2 — REVERSAL PROCESSED SILVER IMAGE, CROSS-PRODUCT SPECTRA

The 10 line per millimeter grating was photographed on three frames of Recordak Micro-File AHU Film with the grating rotational orientations approximately like those in Example 1. The exposure used was 10 seconds at f/5.6 through the Wrattan 99 filter with the Variac set at 75. After the grating exposure was made on each frame, a picture exposure was added. On frame No. 1 a positive picture representing the green component of a visual scene was photographed, on frame No. 2, a positive picture representing the red component of the same scene was photographed, and on frame No. 3 a positive picture representing the blue component was photographed. The exposure used for each picture was 10 seconds, f/5.6 through the Wratten 99 filter with the Variac set at 110. The exposed film was then reversal processed as follows:
1. 4 minutes, Kodak Developer DK-50 (1:1), 70° F. (dip agitation)
2. 1 minute wash
3. 1 minute Kodak R-9 bleach
4. ½ minute wash
5. 1 minute Kodak CB-6 clear
6. 2 minutes wash
7. re-expose: 30 seconds, 6 inches from 100 watt bulb
8. 4 minutes, Kodak DK-50 (1:1), 70° F.
9. 1 minute Kodak Rapid Fix with Hardener
10. 3 minutes wash
11. dry After processing, each frame had a positive black and white image visible by diffuse trans-illumination. When a single frame was projected in the apparatus described in FIG. 7, no picture was produced in plane 108 when the zero order was blocked out. This is evidence that linearity has been met and indicates that the scene for any layer does not modulate the carrier in that layer.

The three frames were then superimposed in register and placed in plane 98 of FIG. 7. Color filters and apertures were placed in the spatial filtering plane 104 so that the cross-product spectra were passed and colored as follows: Cross-product spectra No. 1 were passed through a green filter (Wratten 52). Cross-product spectra No. 1 were produced by the grating to which the red component picture had been added and the grating to which the blue component picture had been added. Cross-product spectra No. 2 were passed through a red filter (Wratten 24). Cross-product spectra No. 2 were produced by the gratings to which the blue component picture had been added and the grating to which the green component picture had been added. Cross-product spectra No. 3 were passed through a blue filter (two layers of Wratten 38). Cross-product spectra No. 3 were produced by the grating to which the green component picture had been added and the grating to which the red component picture had been added.

The cross-product spectra were located at angles half way between the first order spectra of the contributing gratings and at a distance from the optical axis approximately 1.7× the distance of the first order from the optical axis. Only the cross-product spectra within the 60°angles were used; the cross-product spectra within the 120° angles were not used. If the orientations and spacings of the gratings were such that all of the cross-product spectra were adequately isolated, both sets could be color filtered and used.

The image produced in plane 108 was a positive tone image in the correct colors, enlarged about two times. The projected color image was recorded on Ektachrome Daylight (E-3) Sheet Film with an exposure of about 2 minutes, and with standard processing a full color picture was obtained.

EXAMPLE 3 — BLEACHED GRID, NEGATIVE PROCESSED PICTURE, CROSS-PRODUCT SPECTRA

The 10 line per millimeter grating was photographed on three frames of Recordak Micro-File AHU Film. The grating lines for frame No. 1 were at +90° from the horizontal, for frame No. 2, +45° from the horizontal, and for frame No. 3, +135° from the horizontal. These orientations were chosen to eliminate unwanted line patterns produced by the Moire effect. The exposure used was 10 seconds, f/5.6 through the Wratten 99 filter with the Variac set at 75. The film with the grating exposures was treated as follows, all in total darkness:
1. develop 4 minutes, Kodak Developer DK-50 (1:1), 70° F. (dip agitation)
2. wash 1 minute
3. bleach 1 minute Kodak R-9 bleach
4. wash ½ minute
5. clear 1 minute Kodak CB-6 cleaning bath
6. wash 2 minutes
7. dry The dried film was placed back in the camera. The negative representing the green component of a picture was photographed on frame No. 1, the negative representing the red component of the same picture was photographed on frame No. 2, and the negative representing the blue component of the same picture was photographed on frame No. 3. The picture exposures were 10 seconds at f/5.6 with the Variac set at 110. No filter was used.

The picture-exposed films were developed 4 minutes in Kodak Developer DK-50 (1:1) at 70° F., fixed, washed, and dried.

Because negatives were photographed and negative processed, each frame of the processed film showed a positive tone, black-and-white image when examined by diffuse transillumination. When a single frame was projected by the apparatus described in FIG. 7, no picture was produced in plane 108 when the zero order was blocked.

The three frames were then superimposed in register. The composite was placed in plane 98 of the apparatus shown in FIG. 7 for projection. Color filters and apertures were placed in the spatial filtering plane such that the cross product spectra were passed and colored the same as they were for Example 2. A positive tone color image was obtained in plane 108 at about 2× enlargement.

EXAMPLE 4 — PHASE IMAGE-MULTILAYER FILM

A multilayer film comprising the following sensitive layers in the order in which they were coated on a clear film base was utilized:
1. red sensitive emulsion
2. separating layer
3. green sensitive emulsion
4. yellow filter layer
5. blue sensitive emulsion
6. overcoat layer This film was exposed in the Nikon camera using the system above described. Exposures were made on the same frame and in the order listed:
1. 10 line per millimeter grating oriented at −15° from horizontal: 10 seconds, f/5.6, Wratten No. 70 filter (red), Variac at 55 (exposed through base).
2. 10 line per millimeter grating oriented at +45° from horizontal: 10 seconds, f/5.6, Wratten No. 99 filter (green), Variac at 55.
3. 10 line per millimeter grating oriented at +105° from horizontal: 20 seconds, f/5.6, Wratten No. 47B filter, Variac at 120.
4. Negative representing red component of a scene 10 seconds f/5.6, Wratten No. 70 filter, Variac at 75.
5. Negative representing red component at the same scene: 10 seconds, f/5.6, Wratten No. 99 filter, Variac at 65.
6. Negative representing blue component of the same scene: 10 seconds, f/5.6, Wratten No. 47B filter, Variac at 120

The film was then processed as follows:
1. 5 minutes, Kodak Developer D-19, 70° F.
2. 1 minute wash
3. 1 minute Kodak R-9 bleach
4. 2 minutes wash
5. dry The processed film was projected in the spatial filtering apparatus shown in FIG. 7. The first order spectra produced by the grating in the blue sensitive layer was passed through a blue filter (Wratten 38A); the first order spectra produced by the grating in the green sensitive layer were passed through a green filter (Wratten 99) and the first order spectra produced by the grating in the red sensitive layer were passed through a red filter (Wratten 24). Upon projection, a positive tone, full color image was formed on a viewing screen located in picture plane 108.

EXAMPLE 5 — MODULATED GRATING EXPOSURES ON A SINGLE LAYER MIXED GRAIN FILM

A gelantino-silver bromoiodide emulsion coating of the type described in U.S. Pat. No. 2,592,243 contains a blend of red and green sensitized grains. This example demonstrates that the image resulting from an exposure made with red light can be separated from the image resulting from an exposure made with green light when the image exposures additively modulate two separate pre-exposed grating patterns and the processed image is projected in a spatial filtering apparatus such as shown by FIG. 7.

A 35mm Nikon Camera with a Micro-NIKKOR auto f/3.5 55mm focal length lens was used to photograph test objects at 5× reduction, mounted on a Kodak Deluxe Transparency Illuminator, Model 2, using a 100 watt frosted bulb and a 0.125 inch thick piece of Plexiglas W2447, Type C70, as a diffuser.

A 10 line per millimeter grating having equal line and space widths and a black-and-white transparency negative picture test object were sequentially photographed onto a single frame of the emulsion as follows: 1) Grating lines at +45° from horizontal: Wratten No. 93 filter (green), 5 seconds exposure time, lens at f/8, illuminator lamp operated through a Variac set at 75. 2) Picture test object, right-side-up; Wratten No. 93 filter (green), 5 seconds, f/8, Variac at 85. 3) Grating lines at 130° from horizontal; Wratten No. 70 filter (red), 5 seconds, f/8, Variac at 32; and 4) Picture test object, up-side-down; Wratten No. 70 filter (red), 5 seconds f/8 Variac at 37.

The exposed film was processed as follows:
1. 5 minutes, Kodak Developer D-19, 70° F.
2. 10 seconds rinse
3. 1 minute fix in Kodak F-5 hypo
4. 2 minutes wash
5. 1 minute In-4 bleach (1:5) (Bleach from Kodak Chromium Intensifier In-4)
6. 1 ½ minutes wash
7. ½ minute F-5 hypo
8. 2 minutes wash
9. dry The processed film was then projected in the spatial filtering apparatus described in FIG. 7. When the first order spectra produced by the grating made with green light were passed, a positive right-side-up picture was projected onto the screen. When the spectra produced by the grating made with red light were passed, a positive up-side-down picture was projected onto the screen. No cross-talk contamination was noticeable in either picture, thus indicating that in a mixed grain emulsion an image resulting from an exposure made with red light can be separated from an image resulting from an exposure made with green light when the image exposures additively modulate two separate pre-exposed grating patterns and the processed image is projected in a spatial filtering apparatus.

EXAMPLE 6 — PHASE IMAGE, MULTILAYER FILM-ONE SHOT CAMERA EXPOSURE

A multilayer film of the type described in Example 4 was used. An 83 line per millimeter master grating was contact printed three times onto a single frame of the film, once through a Wratten 99 (green) filter, once through a Wratten 98 (blue) filter and once through a Wratten 70 (red) filter. The grating lines were oriented at 0° for the red exposure, 45° for the blue exposure and 90° for the green exposure. The grating exposed film was loaded into a Nikon X camera and an outdoor sunlight scene was photographed at one-sixty second with the lens set at an aperture of f/4.

The film was processed as follows:
1. 5 minutes, Kodak D-19 Developer, 70° F.
2. 10 seconds rinse
3. 2 minutes F5 fixer
4. 2 minutes wash
5. 1 minute In-4 bleach (1:5)
6. 5 minutes wash
7. dry A glass cover was sealed onto the emulsion surface of the processed film with an index matching oil so that only index of refraction effects contributed to the image. The frame was placed in the spatial filtering system. The first order spectra produced by the grating in the blue sensitive layer were passed through a Wratten 98 (blue) filter, the first order spectra produced by the grating in the green sensitive layer were passed through a Wratten 99 (green) filter and the first order spectra produced by the grating in the red sensitive layer were passed through a Wratten 26 (red) filter. The zero order image and spectral orders higher than the first order were blocked. A negative tone, complementary color reproduction of the scene photographed was formed on the projected image plane at about 7× enlargement. This image was recorded on Ektacolor Professional Paper with an exposure of about 10 seconds to produce, after processing, a positive tone, real color picture.

MODIFICATIONS AND EXTENSIONS

The photosensitive layer or layers of photographic films can be exposed to the grating patterns sequentially or all at once during manufacture, for example, by the Clayden pre-screening process disclosed in U.S. Pat. No. 3,110,593 so that a user may obtain a film ready to use with the pre-exposure already on it.

There are several photographic silver halide emulsion systems that can be used in practicing this invention. One is a standard multilayer system, similar to that used for Kodachrome, in which the silver in any color filter layer or layers is bleached or otherwise removed in processing. Another possible photographic element is the mixed grain emulsion described in Carroll and Hanson, U.S. Pat. No. 2,592,243. This emulsion uses a mixture of differently sensitized silver halide grains in a single layer to record a scene. One system for a color forming element is the mixed packet system of Godowsky, et al., U.S. Pat. No. 2,698,794, but this is less satisfactory than those mentioned above for use in accordance with the present invention for reasons of resolution, cost and being limited to printing materials. Yet another possible system using a resulting dye image instead of silver is the dye bleach system described in U.S. Pat. No. 2,612,448, issued Sept. 30, 1952 to Gaspor, where only the non-image dye remains after processing.

It is to be understood that the three color and two color embodiments shown are merely representative and that four or more colors may be used. Too, the invention is not limited to the best mode optical system shown and the use of equivalent or reflective optical systems will be readily apparent. Furthermore, a film consisting of a multilayer combination of single grain type layer or layers and mixed grain type layer or layers may be used.

The invention has been described in detail with particular reference to preferred embodiments thereof, but it will be understood that variations and modifications can be effected within the spirit and scope of the invention.

We claim:

1. A photographic storage product from which cross-product spectra can be optically reconstructed to form a color image of a visual scene from a plurality of recorded component scene images representative of the color components of the visual scene and from recorded gratings associated with the component scene images, said product comprising:
   a support
   a plurality of gratings superposed relative to one another on said support, and
   a plurality of component scene images superposed relative to one another on said support in a one-to-one relationship to said gratings whereby upon passing light therethrough, the component scene images and corresponding gratings produce cross-product spectra which may be optically combined to form said color image corresponding to the visual scene.

2. A photosensitive element adapted to be exposed to a visual scene for recording a plurality of latent images of component scenes which upon development of the element form component scene images which correspond to color components of said visual scene and which are optically reconstructable into a color representation of the visual scene, said element comprising:
   a mixed grain photosensitive layer comprising a plurality of types of grain, every type sensitive to a component color different from that to which any other is sensitive, and
   latent image gratings superposed relative to one another in said layer such that upon exposure of the layer to the visual scene, latent images of the component scenes are recorded in association with said latent image gratings.

3. A photosensitive element adapted to be exposed to a visual scene for recording a plurality of latent component scene images which correspond to color components of said visual scene and which after development of the element form component scene images which are optically reconstructable into a color representation of the visual scene, said element comprising:
   a support, a first layer photosensitive to one of said color components on said support,
   at least a second layer superposed on said first layer and photosensitive to at least another of said color components, and
   latent image gratings superposed relative to one another in said layers whereby upon exposure to the visual scene, latent component scene images are recorded in association with said gratings.

4. The element of claim 3 wherein every layer is photosensitive to a color component different from that to which any other is photosensitive.

5. The element of claim 4 wherein upon the exposure of the element, the layers, the color components, the latent image gratings, and the latent component scene images recorded are like in number.

6. The element of claim 5 wherein the latent image gratings associated with any latent component scene image are disposed in layers other than that in which said latent component scene image is located.

7. The element of claim 5 wherein every latent image grating is disposed in the same layer as the latent component scene image with which such latent image grating is associated.

8. A method of producing a multilayer photosensitive element adapted for recording a plurality of latent component scene images which correspond to color components of a visual scene, said method comprising: providing on a support, a first layer photosensitive to one of said color components and superposed thereon at least a second layer photosensitive to at least another of said color components; and
   exposing the layers to form in said layers latent image gratings which are superposed relative to one another, whereby upon exposure to the visual scene, the plurality of latent component scene images are recorded in association with said latent image gratings in said layers.

9. The method of claim 8 wherein every layer is exposed through a grating having stripes which absorb the light to which that layer is photosensitive.

10. The method of claim 8 and wherein every grating is exposed through a color filter respectively which passes light of the color to which the respective layer is sensitive.

11. A method of producing a photosensitive element adapted for recording a plurality of latent component scene images which correspond to color components of a visual scene and which, after development of the element, are optically reconstructable into a color representation of the visual scene, said method comprising:

providing on a support, a mixed grain photosensitive layer comprising a plurality of types of grain, every type sensitive to a component color different from that to which any other is sensitive, and superposing latent image gratings of like number to the types of grains in the photosensitive layer such that upon exposure to the visual scene, a plurality of latent component scene images associated with the latent image gratings will be recorded.

12. The method of claim 11 wherein the latent image gratings are produced by exposing the mixed grain layer to gratings like in number to the types of grains and in the colors to which the types of grain are sensitive.

13. The method of making a multilayer transparency containing a plurality of component scene images which correspond to color components of a visual scene and containing gratings associated with the component scene images, the first order spectra of the component scene images and associated gratings being optically reconstructable into a color representation of the visual scene upon projection of light through the transparency, said method comprising:

providing on a support, a plurality of superposed layers, every layer being photosensitive to a color component different from that to which any other layer is photosensitive, exposing the plurality of layers to form a plurality of latent image gratings respectively in said layers, exposing the layers to a visual scene such that latent component scene images are recorded in the layers, processing, including bleaching, the layers to form a negative such that the relationship between the exposure and the amplitude transmittance of every layer upon projection of the transparency is non-linear.

14. The method of making a multilayer transparency from which cross-product spectra can be optically reconstructed into a color representation of a visual scene from a plurality of component scene images corresponding to the color components of the visual scene and gratings associated with such component scene images, said method comprising:

providing on a support, a plurality of superposed layers, every such layer being photosensitive to a component color different from that to which any other layer is photosensitive, exposing the layers to form a plurality of latent image gratings respectively in said layers, negatively developing, bleaching, washing and drying the layers in total darkness to retain the sensitivity of the layers to the color components, and to obtain gratings therein.

exposing the still sensitive layers to a visual scene such that a plurality of latent component scene images are recorded respectively on the layers photosensitive thereto, and processing, including developing the layers to form negative images therein.

15. The method of making a transparency having a linear amplitude transmittance in relation to exposure for every layer, and containing a plurality of component scene images representative of color components of a visual scene, said transparency containing gratings associated with the component scene images, the cross-product spectra of the component scene images and associated gratings being optically reconstructable into a color representation of the visual scene, said method comprising:

providing on a support, a plurality of superposed layers, every layer being photosensitive to a color component different from that to which any other layer is photosensitive, exposing the plurality of layers to form a plurality of latent image gratings respectively with the gratings superposed relative to one another, exposing the photosensitive layers to a visual scene such that a plurality of latent component scene images are recorded in the layers in association with the latent image gratings, and reversal processing the photosensitive layers so that the relationship between exposure of every layer and the amplitude transmittance of that same layer as developed, produced upon projection of the transparency, is linear, i.e., for every layer: $T_A \alpha E$ where:
$T_A$ is the amplitude transmittance of the developed layer
$E$ is the exposure of the layer.

\* \* \* \* \*

UNITED STATES PATENT OFFICE
CERTIFICATE OF CORRECTION

Patent No. 3,663,221          Dated May 16, 1972

Inventor(s) George C. Higgins, Clark N. Kurtz, F. C. Eisen

It is certified that error appears in the above-identified patent and that said Letters Patent are hereby corrected as shown below:

Column 4, lines 49 and 50, "$R_s S_r E$ is represented by" should read ---$R_r S_r$. Adding the three color terms the total exposure E is represented by---. Column 5, lines 58 and 61, "$R_r(1 \alpha S_r)$" should read ---$R_r(1-S_r)$---. Column 5, line 63, "$T_r \propto e^{ik\mu R_r(1+S_r)}$" should read ---$T_r \propto e^{ik\mu R_r(1-S_r)}$---. Column 5, line 75, "$T_r T_b T_g \propto e^{ik\mu R_r(1\ S_r)} e^{ik\mu R_b(1\ S_b)} e^{ik\mu R_g(1\ S_g)}$" should read ---$T_r T_b T_g \propto e^{ik\mu R_r(1-S_r)} e^{ik\mu R_b(1-S_b)} e^{ik\mu R_g(1-S_g)}$---.

Signed and sealed this 5th day of September 1972.

(SEAL)
Attest:

EDWARD M. FLETCHER, JR.          ROBERT GOTTSCHALK
Attesting Officer          Commissioner of Patents